United States Patent [19]
Golestani

[11] Patent Number: 5,050,162
[45] Date of Patent: * Sep. 17, 1991

[54] CONGESTION FREE PACKET NETWORK

[75] Inventor: S. Jamaloddin Golestani, Parsippany-Troy Hills, N.J.

[73] Assignee: Bell Communications Research, Inc., Livingston, N.J.

[*] Notice: The portion of the term of this patent subsequent to Sep. 17, 2008 has been disclaimed.

[21] Appl. No.: 326,027

[22] Filed: Mar. 20, 1989

[51] Int. Cl.⁵ ............................................. H04Q 11/04
[52] U.S. Cl. ..................................... 370/60; 370/85.6; 370/118; 340/825.51
[58] Field of Search ...................... 370/60, 94.1, 85.15, 370/94.3, 85.12, 84, 77, 82, 85.6, 100.1, 105.1, 118; 340/825.5, 825.51, 825.06, 825.52

[56] References Cited

U.S. PATENT DOCUMENTS

| 4,734,908 | 3/1988 | Hedlund | 370/94.1 |
| 4,779,267 | 10/1988 | Limb | 370/94.1 |
| 4,841,523 | 6/1989 | Roffinella et al. | 370/94.1 |
| 4,858,232 | 8/1989 | Diaz et al. | 370/85.15 |
| 4,878,218 | 10/1989 | Takada | 370/94.1 |
| 4,914,650 | 4/1990 | Sriram | 370/60 |

OTHER PUBLICATIONS

"Network Delay Considerations for Packetized Voice", P. M. Gopal and Bharath K. Kadaba, Performance Evaluation, vol. 9 (1988/89), pp. 167-180.

"Guaranteed Delay for Voice Traffic in an Integrated Packet-Switched Network", IBM Technical Disclosure Bulletin, vol. 29, No. 9, Feb. 1987.

"A Schedule-Based Approach for Flow-Control in Data Communication Networks", Utpal Mukherji, Ph.D Thesis, MIT, Deaprtment of Electrical Engineering and Computer Science, Cambridge, Mass., Jan. 6, 1986.

Primary Examiner—Douglas W. Olms
Assistant Examiner—Alpus H. Hsu
Attorney, Agent, or Firm—James W. Falk

[57] ABSTRACT

A congestion control scheme for a connection oriented packet network is disclosed. The congestion control scheme eliminates buffer overflow and provides congestion free communication by eliminating the clustering of packets. Clustering is eliminated by imposing a smoothness requirement on the packet stream of each connection at the corresponding source node in the packet network. The smoothness is maintained for each connection over every link traversed by a connection through use of a unique queuing strategy at the nodes wherein packets arriving at a node in an incoming frame are delayed and transmitted from the node in an adjacent outgoing frame.

21 Claims, 7 Drawing Sheets

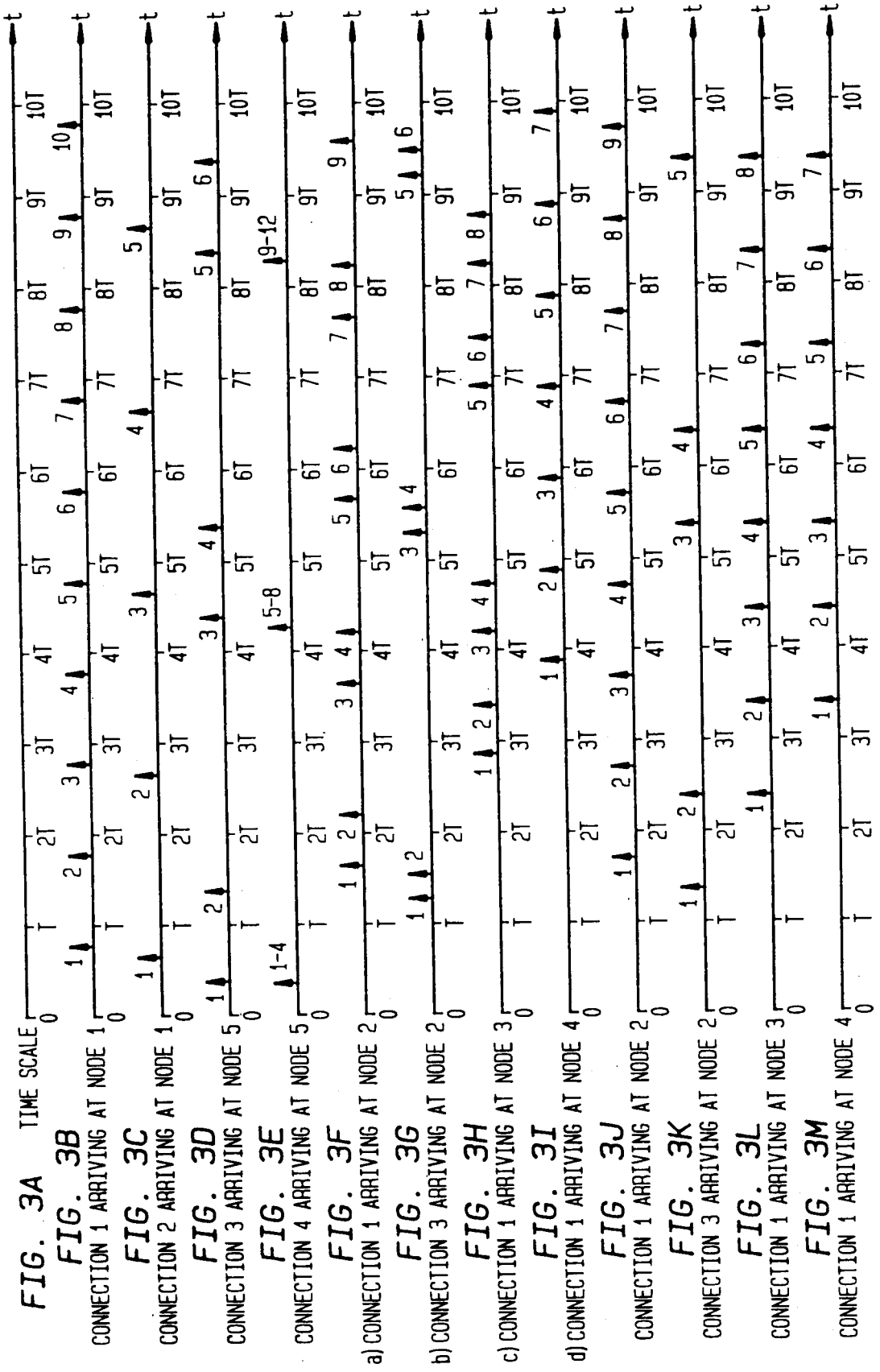

CONGESTION FREE PACKET NETWORK

FIELD OF THE INVENTION

The present invention relates to a traffic regulation and packet transmission scheme for connection-oriented packet networks which eliminates buffer overflow and provides congestion free communication.

BACKGROUND OF THE INVENTION

A packet network generally comprises an array of switching nodes which are interconnected by transmission links. A typical connection involves the transmission of a packet stream from a source node to a destination node via one or more intermediate nodes and via one or more of the connecting links. The packet stream of each connection arrives at the corresponding source node from a packet source such as a unit of customer premises equipment. The packet stream is illustratively delivered to destination equipment after reception at the destination node.

Congestion arises in a packet network for a variety of reasons. One way congestion arises is when sources of packets overload the network by transmitting too many packets into the network. Congestion also arises because particular sources are not smooth and transmit packets into the network in bursts.

In a connection oriented packet switching network, congestion control is generally achieved by allocating, or reserving, transmission capacity for each connection on the appropriate links before the connection is setup. Such capacity allocation might be done based on the average rates of the connections (whereby statistical multiplexing is utilized) or based on the peak rates of the connections (whereby no statistical multiplexing is utilized).

Neither the peak-rate capacity reservation approach nor the average-rate capacity reservation approach totally eliminates congestion in a packet switching network.

The reason for this is packet clustering. Packet clustering arises in a packet switching network as follows. Typically, each node in a packet switching network utilizes a FIFO queuing strategy. This means that packets arriving at a node and destined for a specific outgoing link are queued and served by the outgoing link on a first-in, first-out basis. Sometimes, a packet from one particular connection is queued while packets from one or more other connections are served by the particular outgoing link. Very often, this causes packets from the particular connection to cluster together. This clustering phenomena can lead to congestion in a conventional packet switching network. When clustering occurs, buffers at the nodes may fill up. When the buffers at a node fill up, transmission to the node may be stopped resulting in congestion. If this happens at a plurality of adjacent nodes, packet network "gridlock" results. Alternatively, packets may be lost due to buffer overflow, depending on the size of the buffers. It should be noted that packet clusters can arise whether capacity is allocated based on the peak-rate or the average-rate of connections and can arise even if the packet streams of the connections are initially smooth.

In view of the foregoing, it is an object of the present invention to provide a traffic regulation and packet transmission scheme for packets in a connection-oriented packet network which eliminates packet clustering so as to provide congestion free communication without packet losses due to overflowing buffers at the network nodes.

SUMMARY OF THE INVENTION

In accordance with the present invention, congestion in a packet network is eliminated by imposing a smoothness requirement on the packet stream of each connection as it enters the packet network at a source node, and by maintaining the smoothness (i.e. the absence of clustering) of the packet stream of each connection on each link traversed by a connection. The smoothness of the packet stream of each connection is maintained on each link traversed by a connection through use of a unique queuing strategy at the network nodes.

To carry out the invention, a time period of duration T is globally defined for the packet network. Packets of particular connections arrive at the corresponding source nodes in successive time intervals or frames of duration T. In addition packets are transmitted between network nodes via links in successive time intervals of duration T.

Each connection k in the network is allocated a transmission rate $r_k$. The packet stream of a connection k is smooth if the number of packets transmitted by the connection k in any frame of duration T does not exceed $r_k \cdot T$. The rates $r_k$, which are allocated to particular connections k, are chosen such that the packet stream of each connection is smooth when it arrives at the corresponding source node, i.e. the number of packets from a connection k arriving at the source node for connection k in any frame from a sequence of frames of duration T is bound by $r_k \cdot T$.

This smoothness is maintained for each connection such as the connection k over all the links traversed by the connection through use of the following queuing strategy at the network nodes.

Packets arrive at a node via particular incoming links in incoming frames of duration T. Packets leave the node via particular outgoing links in outgoing frames of duration T. As used herein, an outgoing frame of a particular outgoing link is adjacent to an incoming frame, if it is the first outgoing frame which starts after the end of the incoming frame. Packets arriving at a node in an incoming frame and addressed to a particular outgoing link are delayed at the node and transmitted via the particular outgoing link in the outgoing frame which is adjacent to the incoming frame during which the packet arrived.

Thus, if the packet stream of a connection is smooth as it enters the network at its source node and the queuing strategy described above is practiced at the network nodes, the packet stream is maintained as smooth over all links traversed by the connection, and packet clustering is eliminated. The primary cost involved in eliminating the packet clusters is the additional delay incurred at the nodes so that the packets are transmitted in the adjacent outgoing frames. This delay is not detrimental when an appropriate value for the duration T is chosen. No such delay is introduced when a conventional FIFO queuing strategy is used at the network nodes, and the result may be packet congestion.

It is a significant advantage of the present invention that only a slight modification of the conventional FIFO queuing structure used at the packet network nodes is necessary to implement the smoothness-maintaining queuing strategy.

It is also a significant advantage of the present invention that the end-to-end delay for the packets of a particular connection are constant except for a small delay jitter. In contrast, when the conventional FIFO queuing strategy is used at the network nodes, the end-to-end delays for the packets of a particular connection are variable and unpredictable.

The congestion control technique of the present invention eliminates buffer overflow and provides connection free communication for connection oriented services. The only other congestion control scheme for accomplishing this is a generalization of the time division multiplexing (TDM) concept and requires that time slots be assigned a priori for the transmission of packets for each connection (see e.g., Mukherji, U., 1986, "A Schedule-Based Approach for Flow Control in Data Communication Networks", Ph. D Thesis, MIT, Department of Electrical Engineering and Computer Science, Cambridge, Mass.). The present invention enables congestion free communication without the use of a slot reservation scheme.

BRIEF DESCRIPTION OF THE DRAWING

FIGS. 3a-3m schematically illustrate the transmission of packets in accordance with a conventional FIFO queuing strategy and in accordance with the present invention.

DETAILED DESCRIPTION

The detailed description of the invention is divided into the following sections: Section a provides a definition of smoothness for a packet stream. Section b shows how clustering arises when a conventional FIFO queuing strategy is used at the nodes of a packet network. Section c sets forth the packet transmission scheme of the present invention including a unique queuing strategy at the network nodes and shows how this transmission scheme eliminates packet clustering. Section d describes how the network nodes are implemented to carry out the packet transmission scheme of the present invention.

a. Definition of Smoothness

Before describing the packet transmission scheme of the present invention in detail, it is useful to explain more fully how congestion arises in a packet switching network.

Figure 1:
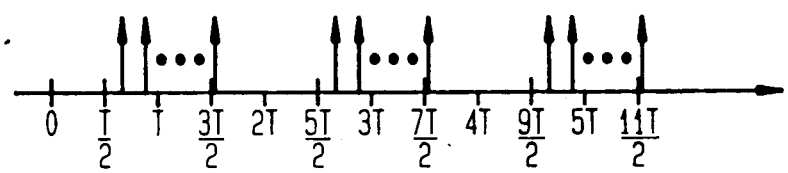
FIG. 1 schematically illustrates a packet stream which is smooth in accordance with the definition of smoothness utilized in the present invention.

To do this, it is first desirable to define smoothness with respect to a stream of packets. A stream of packets is defined to be smooth with respect to the rate r (in packets per unit time) and the duration T, if the total number of packets arriving at a node over any interval $[(m-1)T, mT] m = -\infty \ldots 0, 1 \ldots \infty$ is bounded by $r \cdot T$. FIG. 1 illustrates a packet stream that is smooth with respect to the rate $r = 2/T$ and duration T. In FIG. 1, the arrival of a packet at a particular node is indicated by an arrow. Thus, in any of the intervals [0,T], [T,2T], [2T,3T], [3T,4T], [4T,5T] there is a maximum of two (i.e. $r = 2/T$ produced with T) packets. It should be noted that the definition of smoothness is dependent on the time origin specified. If in FIG. 1, the origin is shifted by T/2 so that the intervals [T/2, 3T/2], [3T/2, 5T/2], [5T/2, 7T/2] are considered, the stream is no longer smooth with respect to the rate $r = 2/T$ as some of the intervals have three packets.

b. The FIFO Queuing Strategy Results In The Clustering of Packets

Figure 2:
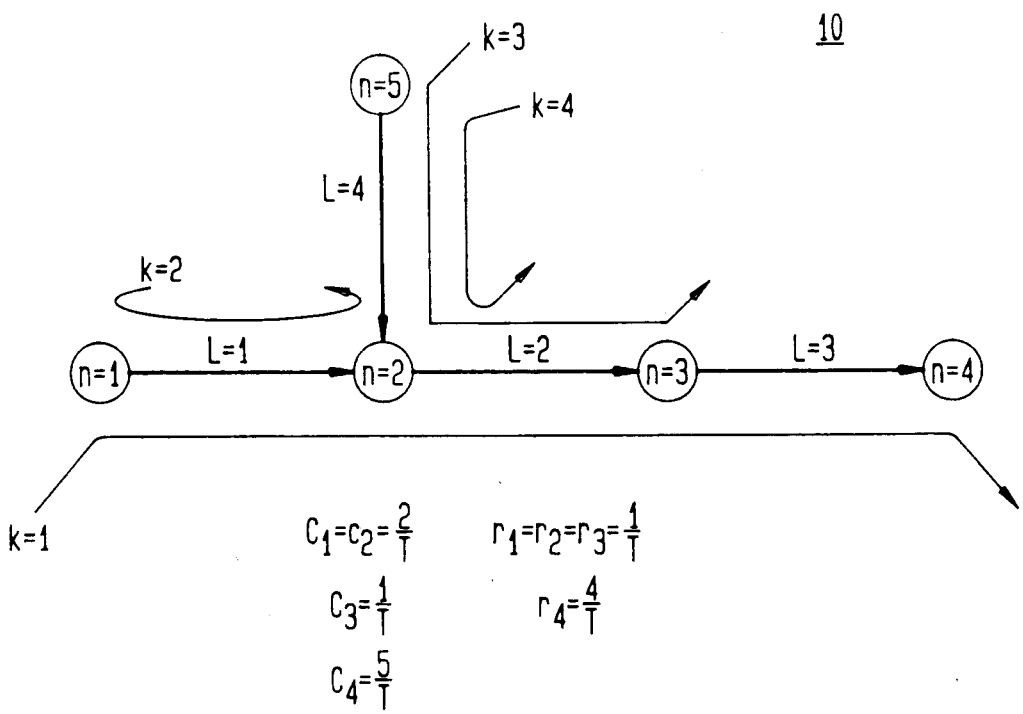
FIG. 2 schematically illustrates a packet network which can transmit packets in accordance with the present invention.

To understand how packet clustering arises in a network, consider the packet network 10 of FIG. 2. The network n of FIG. 2 has five nodes, n = 1, 2, 3, 4, and 5. The network 10 also has four interconnecting links L = 1,2,3,4. The capacities of the links L = 1,2,3,4 are $C_1 = C_2 = 2/T$, $C_3 = 1/T$, $C_4 = 5/T$.

The following connections are setup in the network of FIG. 2. Connection k = 1 connects the source node n = 1 to the destination node n = 4, connection k = 2 connects the source node n = 1 to the destination node n = 2, connection k = 3 connects the source node n = 5 to the destination node n = 3, and connection k = 4 connects the source node n = 5 to the destination node n = 2. The transmission rates allocated to the connections k = 1,2,3,4 are $r_1 = r_2 = r_3 = 1/T$ and $r_4 = 4/T$. These rates are feasible in that the sum of the allocated rates of all the connections traversing a link is equal to or less than the capacity of the link.

FIG. 3a shows a time scale used in connection with the network 10 of FIG. 2. The time scale is divided into a sequence of intervals or frames of duration T. FIG. 3b shows the packets which arrive at the source node n = 1 and are to be transmitted via the connection k = 1 to the destination node n = 4. It should be noted that the packet stream of FIG. 3b is smooth with respect to the rate $r_1 = 1/T$ and the duration T in that no more than $r_1 \cdot T$ (i.e. one) packets arrives at the node n = 1 during each frame of duration T.

FIG. 3c shows the stream of packets arriving at the source node n = 1 to be transmitted to the destination node n = 2 via the connection k = 2. The packet stream of FIG. 3c is smooth with respect to $r_2 = 1/T$ and duration T in that no more than $r_2 \cdot T$ (i.e. one) packet arrives at the node n = 1 in any frame of duration T.

FIG. 3d shows the stream of packets arriving at the source node n = 5 to be transmitted to the destination node n = 3 via the connection k = 3. The packet stream of FIG. 3d is smooth with respect to $r_3 = 1/T$ and duration T in that no more than $r_3 \cdot T$ (i.e. one) packet arrives at the node $n=5$ in any frame of duration T.

FIG. 3e shows the stream of packets arriving at the source node $n=5$ to be transmitted via the connection $k=4$ to the destination node $n=2$. Note that the packets of FIG. 3e arrive at the node $n=5$ in bursts. Packets 1-4 arrive one after the other and then there is a long gap before the next burst of packets, comprising packets 5-8, arrives. However, according to the definition of smoothness used herein, the stream of FIG. 3e is smooth. The number of packets arriving in any frame of duration T is equal to or less than the product of $r_4=4/T$ and T.

Thus, all of the packet streams entering the network 10 of FIG. 2 are initially smooth. In addition, in any interval of duration T, the sum of the average rates of the connections traversing any link is equal to or less than the capacity of the link. However, despite this, when a FIFO queuing strategy is used at the nodes, congestion develops in the network.

FIGS. 3f-3i show that it is the interaction of the packets from the various connections at the nodes which causes clustering and the resultant congestion. In FIGS. 3f-3i it is assumed that the propagation delays of the links and the processing delays at the nodes are negligible. FIG. 3f shows the packets of connection $k=1$ as they arrive at the node $n=2$ via the link $L=1$. To understand FIG. 3f, it is necessary to consider FIGS. 3b and 3c. The link $L=1$ services packets arriving at the node $n=1$ using the FIFO queuing strategy. As shown in FIG. 3c, the first packet arriving at the node $n=1$ is the packet 1 of connection $k=2$. As shown in FIG. 3b, the second packet arriving at the node $n=1$ is the packet 1 of connection $k=1$. Thus, in accordance with the FIFO queuing strategy, the packet 1 of connection $k=1$ is queued while the packet 1 of connection $k=2$ is serviced by the link $L=1$. The third packet arriving at the node $n=1$ is the packet 2 of connection $k=1$. Thus, the packet 2 of connection $k=1$ does not have to wait for a packet from connection $k=2$ to be serviced. Accordingly, as shown in FIG. 3f the packets 1 and 2 of connection $k=1$ arrive at the node $n=2$ relatively closer together than they previously arrived at node $n=1$.

As shown in FIG. 3c the fourth packet to arrive at the node $n=1$, is the packet 2 of connection $k=2$. The fifth packet to arrive at the node $n=1$ is the packet 3 of connection $k=1$. Thus, the packet 3 of connection $k=1$ is queued while the packet 2 of connection $k=2$ is serviced by the link $L=1$. The sixth packet to arrive at the node $n=1$ is the packet 4 of connection $k=1$. Since this packet does not compete with a packet from the connection $k=2$, it is serviced immediately by the link $L=1$. For this reason, the packets of connection $k=1$ arrive at the node $n=2$ in pairs i.e. packets 1, 2 of connection $k=1$ are paired, packets 3, 4 of connection $k=1$ are paired. However, as shown in FIG. 3f, the packet stream of connection $k=1$ arriving at the node $n=2$ is still smooth. The number of packets in any frame of duration T is still bound by the product of $r_1=1/T$ and T (i.e. one).

In a similar fashion, the packets of connections $k=3$ and $k=4$ compete for service by the link $L=4$ at the node $n=5$. As shown in FIGS. 3d and 3e, the first four packets to arrive at the node $n=5$ are a burst of packets 1-4 of connection $k=4$. The fifth packet to arrive at the node $n=4$ is the packet 1 of connection $k=2$. In accordance with the FIFO queuing strategy, the packet 1 of connection $k=3$ is queued at the node $n=4$ while the packets 1-4 of connection $k=4$ are serviced by the link $L=4$. Only then is the packet 1 of connection $k=3$ serviced by the link $L=4$. The sixth packet to arrive at the node $n=4$ is the packet 2 of the connection $k=3$, and this packet is serviced immediately by the link $l=4$. In short, because of the FIFO queuing strategy at the node $n=4$, the competition for service between the packets of connections $k=3$ and $k=4$, and the lack of regularity in the arrival of the packets of connection $k=4$, the packets of connection $k=3$ arrive at the node 2 in clusters (see FIG. 3g). In fact, the packet stream of FIG. 3g is no longer smooth, in that some of the frames of duration T have more than $r_3 \cdot T$ (i.e. one) packet.

At the node $n=2$, the arriving stream of connection $k=1$ (FIG. 3f) and the arriving stream of connection $k=3$ (FIG. 3g) compete for service by the link $L=2$ for transmission to node 3 using the FIFO strategy. Thus, for example, the packets 1,2,3,4 of connection $k=1$ are serviced by the link $L=2$ one after another but only after the packets 1 and 2 of the connection $k=3$ are serviced. The result of this competition on the stream of connection $k=1$ is shown in FIG. 3h. In particular, as shown in FIG. 3h, the packets of connection $k=1$ arrive at the node $n=3$ in clusters of four. Thus, to avoid congestion or packet overflow, a buffer for storing at least three packets is needed at the node $n=3$. If a smaller buffer is utilized, transmission to the node $n=3$ will be stopped or packets will be lost due to overflow. The stream of packets of connection $k=1$ arriving at the node $n=3$ is no longer smooth. The number of packets arriving in some of the frames of duration T exceeds $r_1 \cdot T$ (i.e. one). An example of such a frame is the interval [4T,5T]. If a buffer of suitable length is present at the node $n=3$, the packets of the connection $k=1$ arrive at the node $n=4$ via the link $L=3$ in a smooth fashion as shown in FIG. 3i.

It should be noted that if more nodes and more connections are added to the network 10 more and more packets will cluster together requiring larger and larger queues to prevent congestion or queue overflow.

c. The Packet Transmission Scheme of the Present Invention Eliminates Packet Clustering In accordance with the present invention, congestion and buffer overflow are eliminated by imposing a smoothness requirement on the packet stream of each connection as it enters the corresponding source node. (The packet streams of FIGS. 3b, 3c, 3d and 3e of connections $k=1,2,3,4$ meet this smoothness requirement). More particularly, the number of packets transmitted by connection k to the source node for connection k is bound by $r_k \cdot T$. This smoothness requirement is maintained for the connection k on each link in the network traversed by the connection k.

To insure that a connection whose packet stream is initially smooth, and remains smooth on each link traversed by the connection, a unique queuing strategy is utilized at the network nodes. Packets, arriving at a node in an incoming frame of duration T and destined for an outgoing link L, are delayed at the node, and transmitted from the node via the outgoing link L in an outgoing frame of duration T, which is adjacent to the incoming frame during which the packet arrived. As used herein, an outgoing frame on a particular outgoing link is adjacent to an incoming frame, if it is the first outgoing frame on that outgoing link which starts after the incoming frame is complete. When the packet stream for each connection is initially smooth (i.e. when the number of packets arriving at the source node for connection k is bound by $r_k \cdot T$), this queuing strategy insures that the packet stream of each connection remains smooth on each link traversed by a connection (i.e. that on any link traversed by the connection k the number of packets in a frame duration T is bound by $r_k \cdot T$).

Figure 4A:
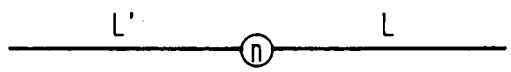
FIGS. 4a and 4b illustrate a node n and an arrangement of frames of duration T entering and leaving the node n, respectively.
Figure 4B:
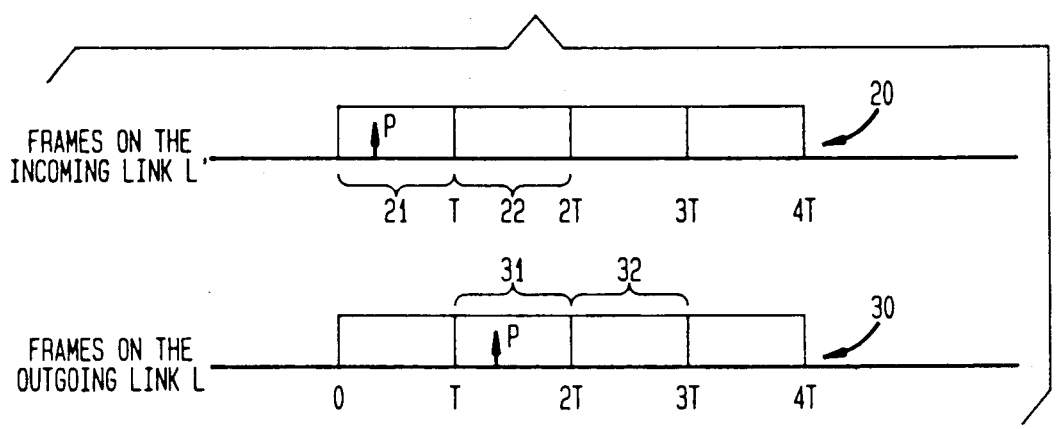

FIG. 4b illustrates the frames 20 arriving at a node n (see FIG. 4a) on an incoming link L' and the frames 30 leaving the node n via an outgoing link L. Note that incoming and outgoing frames of FIG. 4 are entirely synchronous. The incoming and outgoing frames can be so synchronized for all nodes in a network when propagation delays and processing delays at the nodes are negligible. As indicated above, an outgoing frame and an incoming frame are adjacent if the outgoing frame is the first outgoing frame which starts after the completion of the incoming frame. Thus, in FIG. 4, outgoing frame 31 is adjacent to incoming frame 21 and outgoing frame 32 is adjacent to incoming frame 22. In accordance with the present invention a packet arriving at the node n during the incoming frame 21, leaves the node n in the adjacent outgoing frame 31.

Figure 5:
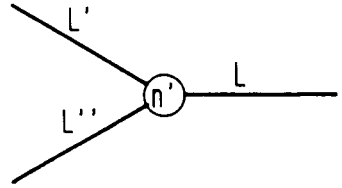
FIGS. 5 and 6 illustrate an alternative node n' and an alternative arrangement of frames of duration T entering and leaving the node n', respectively.
Figure 6:
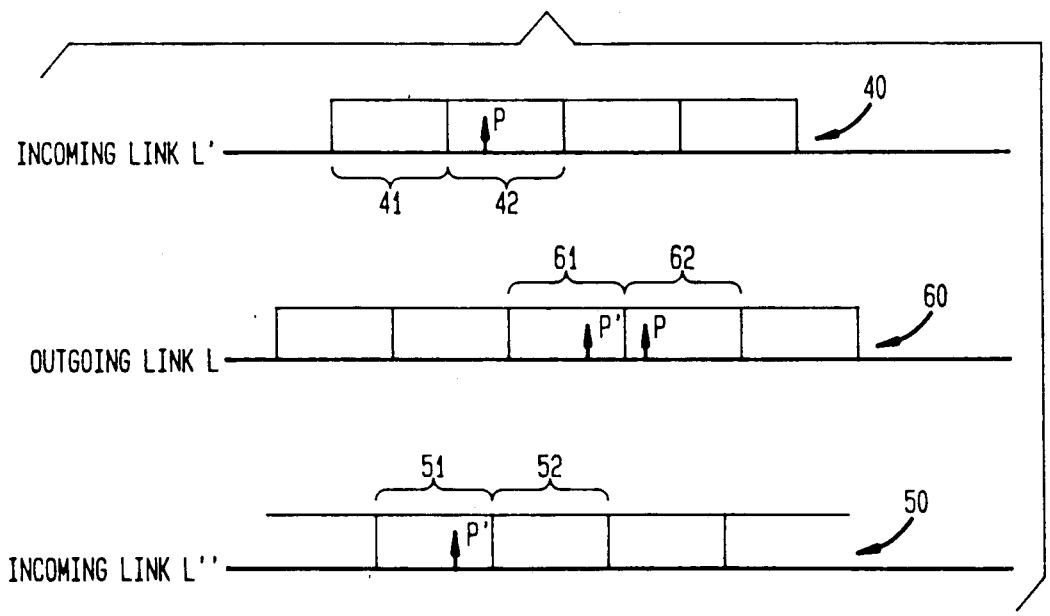

FIG. 6 illustrates a situation where the incoming and outgoing frames at a node are not synchronized. As shown in FIG. 5, a node n' has two incoming links L', L'' and an outgoing link L. The incoming frames 40 arrive on the link L' and the incoming frames 50 arrive on the link L''. The outgoing frames 60 leave the node n' on the outgoing link L. The outgoing frame 61 is adjacent to the incoming frame 41 on link L' and the incoming frame 51 on link L''. Similarly, the outgoing frame 62 is adjacent the incoming frame 42 on link L' and the incoming frame 52 on link L''. In accordance with the present invention, a packet P arriving on link L' during the frame 42 leaves during the adjacent outgoing frame 62. In a similar fashion, a packet P' arrives on the link L'' during the incoming frame 51 and leaves during the adjacent outgoing frame 61. Thus, the packets P, P' are not served by the outgoing link L in a first-in, first-out order. Instead, the packet P' arrives at the node after the packet P but leaves the node first.

FIGS. 3j–3m show that when the nodes utilize the queuing strategy of the present invention (rather than the conventional FIFO queuing strategy) in connection with the example of the network 10 of FIG. 2, packet clustering is eliminated. FIGS. 3j–3m are based on the frames of duration T defined in FIG. 3a. Looking first at FIGS. 3b, 3c, packet 1 from connection k=2 and packet 1 from connection k=1 arrive at node 1 during the interval or frame [0,T]. Thus both of these packets are delayed at node n=1 until the interval [T,2T] (i.e. the adjacent outgoing frame) during which both are transmitted to the node n=2 via the link L=1. The arrival of the packet 1 of connection k=1 at node n=2 is shown in FIG. 3j. The packet 2 of connection k=1 arrives at the node n=1 during the interval [T,2T]. This packet is delayed at the node n=1 until the interval [2T,3T] (i.e. the adjacent outgoing frame), during which interval it is transmitted to the node n=2. The arrival of the packet 2 of connection k=1 at the node n=2 during the interval [2T,3T] is shown in FIG. 3j. Similarly, packet 3 of connection k=1 and packet 2 of connection k=2 arrive at node n=1 during the interval [2T,3T]. These packets are transmitted to the node n=2 during the adjacent outgoing frame which is [3T,4T]. The arrival of the packet 3 of connection k=1 at node n=2 is shown in FIG. 3j.

By comparing FIG. 3j with FIG. 3f it can be seen that the arrival of the packets of the connection k=1 at node n=2 is much smoother when the queuing strategy of the present invention is used (FIG. 3j) than when the standard FIFO queuing strategy is used (FIG. 3f).

The transmission of packets of connection k=3 and k=4 from node n=5 to the node n=2 in accordance with the present invention is now considered. As shown in FIGS. 3d and 3e, in the interval [0,T], packet 1 of connection k=3 and packets 1–4 of connection k=4 arrive at the node n=5. These packets are transmitted to the node n=2 in the adjacent outgoing frame, i.e. the interval [T,2T] The arrival of the packet 1 of the connection k=3 at node n=2 is shown in FIG. 3k. The arrival of the remainder of the packets from connection k=2 at the node n=2 is also shown in FIG. 3k.

When the packets of the connections k=3 and k=4 are transmitted from node n=5 to node n=2 in accordance with the present invention, the stream of packets of connection k=3 which arrives at node n=2 is much smoother than if the conventional FIFO queuing strategy is utilized. (Compare FIG. 3k and FIG. 3g). In fact, the packet stream of FIG. 3g, which results when the packets of the connection k=3 are transmitted from node n=5 to node n=2 in accordance with the conventional FIFO queuing strategy, is not smooth (i.e. the $r_3 \cdot T$ limit on the number of packets per frame is violated in the intervals [T,2T],[5T,6T] etc.) In contrast, the stream of FIG. 3k which results when the packets of connection k=3 are transmitted from node n=5 to node n=2 in accordance with the present invention, is smooth.

At the node 2, the packets from connection k=1 and connection k=3 are serviced by the link L=2 for transmission to the node n=3. The arrival of the packets from connection k=1 at the node n=3 is shown in FIG. 3l. As shown in FIGS. 3j and 3k, the packet 1 from connection k=1 and the packet 1 from connection k=3 arrive at the node n=2 during the interval [T,2T]. In accordance with the present invention, these packets are serviced in the adjacent outgoing frame, i.e. the interval [2T,3T]. Thus, as shown in FIG. 3l, the packet 1 of connection k=1 arrives at the node =3 during the interval [2T,3T]. Similarly, the packet 2 from connection k=1 and the packet 2 from connection k=3 arrive at the node n=3 during the interval [2T,3T]. These packets are serviced during the interval [3T,4T] (i.e. the adjacent outgoing frame) so that as shown in FIG. 3l, the packet 2 of the connection k=1 arrives at the node n=3 during the interval [3T,4T]. In this manner all the packets of connection k=1 arrive at the node n=3.

It should be noted that the stream of packets from the connection k=1 which arrives at the node n=3 is smooth. As shown in FIG. 3l, no more than one packet of connection k=1 per frame of duration T arrives at the node n=3. Thus, a buffer for storing one packet is all that is required at the node n=3. In contrast when the FIFO queuing strategy is used, the packets of the connection k=1 arrive at the node n=3 in clusters of four packets as shown in FIG. 3g so that a buffer for storing three packets may be required to avoid packet loss. Thus, when the transmission scheme of the present invention is utilized, packet clustering is eliminated thereby eliminating any resultant congestion or buffer overflow. In particular circumstances, shorter buffers may be utilized. The transmission of the packets of connection k=1 from node n=3 to node n=4 is via the link L=3 shown in FIG. 3m.

In short, the present invention eliminates congestion by imposing a smoothness property on all connections throughout the network. In accordance with the present invention packets may be viewed as being transmitted between nodes via links in sequences of time intervals or frames of duration T. The duration T is globally established for the entire network. It should be noted that the time origin for the frames on different links may be chosen differently. For example, at a node all the arriving frames or all the departing frames may be synchronous.

The following criteria may be considered in choosing the duration T. First, it should be noted that for a longer duration T, the packets will experience greater end-to-end delays. Thus, T should be chosen so that the resulting end-to-end packet delays are tolerable for the services being offered. Second, it should be noted that for a longer duration T, the buffer requirements at the nodes are greater. (It can be shown that the maximum buffer capacity for a link L is $3C_LT$ where $C_L$ is tha capacity of the link). Thus, T should be chosen so that the resulting buffer requirements are feasible. Thirdly, T should be chosen large enough to accommodate the smallest rate allocation which is utilized (i.e. T is preferably chosen larger than $1/r_{min}$). In addition, it is desirable for T to be chosen large enough so that the rates allocated to particular connections are as distant as possible from the peak rates of the connections.

A rate $r_k$ is allocated to a connection k such that $$\Sigma r_k \leq C_L \tag{1}$$

All connections traversing link L where $C_L$ is the capacity of the link L in packets per unit time.

The rates $r_k$ are also allocated such that the packet stream of every connection k is smooth when it arrives at the source node for the connection k. Alternatively, such smoothness may be imposed by suppressing the transmission of some of the packets from particular sources. As indicated above, a stream is smooth if the number of packets arriving at the source node in a frame of duration T does not exceed $r_k \cdot T$. The rate $r_k$ is in between the instantaneous peak-rate of the connection k and the long-term average rate of the connection k. As the duration T is made larger, the rate $r_k$ asymtotically approaches the long term average rate for the connection k.

Thus, the packet stream arriving at the corresponding source node for each connection is smooth. The packets are transmitted through the network such that this smoothness is maintained individually for each connection over each link traversed by the connection.

To maintain the smoothness, a unique queuing strategy may be utilized at the network nodes. A packet which arrives at a node in an incoming frame is delayed at the node and serviced by the appropriate outgoing link in the adjacent outgoing frame. As indicated above an outgoing frame on a particular outgoing link is adjacent to an incoming frame when the outgoing frame is the first outgoing frame to start after the completion of the incoming frame.

When rates are allocated and packets are transmitted in the foregoing manner packet clustering is eliminated. When packet clustering is eliminated, the resulting problems of congestion and overflowing buffers are also eliminated. In fact the present invention guarantees congestion free transmission with smaller queue sizes than are required when the conventional FIFO queuing strategy is utilized. In contrast to the present invention, with the conventional FIFO queuing strategy, it is almost impossible to guarantee congestion free communication no matter what the capacity of the buffers at the nodes. In addition, when the traffic regulation and packet control scheme of the present invention is utilized, the end-to-end delay for the packets of a particular connection is constant except for a small jitter delay. In contrast, the conventional FIFO queuing strategy results in end-to-end delays which are variable and unpredictable.

d. Node Structure for Carrying Out the Inventive Packet Transmission Scheme

Figure 7:
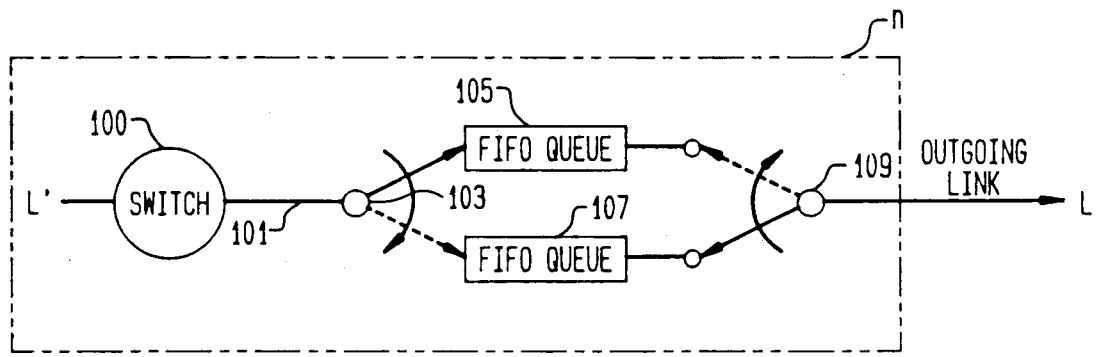
FIGS. 7, 8, and 9 schematically illustrate node structures for transmitting packets in accordance with illustrative embodiments of the present invention.

Packet switching nodes which service arriving packets in accordance with the present invention are easily implemented. FIG. 7 shows an embodiment of the node n of FIG. 4a wherein the incoming frames which arrive via the link L' are synchronous with outgoing frames which leave via the link L'. Synchronous incoming and outgoing frames are shown in FIG. 4b. In reality a typical node such as the node n of FIG. 7 has a plurality of incoming links and a plurality of outgoing links. However, for purposes of clarity only one incoming link L' and one outgoing link L are shown in FIG. 7.

The node n comprises a switch 100 which routes incoming packets to a particular outgoing links, depending, for example, on an address header contained in a header of the packet. Packets destined for the outgoing link L emerge from the switch 100 on line 101. These packets are routed by a switch 103 to one of two FIFO queues 105,107. The switch 103 is synchronized with the incoming and outgoing frames so that during alternate incoming frames, the packets are routed to the alternate FIFO queues 105,107. Thus, during one incoming frame the packets are stored in the FIFO queue 105 and in the next frame they are stored in the FIFO queue 107. The packets are connected to the outgoing link L via the switch 109. The switch 109 is out of phase with the switch 103 such that during a frame in which packets are being stored in the queue 105, packets stored in the queue 107 during the previous frame are provided with access to the outgoing link L. In this manner, a packet which arrives in an incoming frame is served by the link L in the adjacent outgoing frame.

Figure 8:
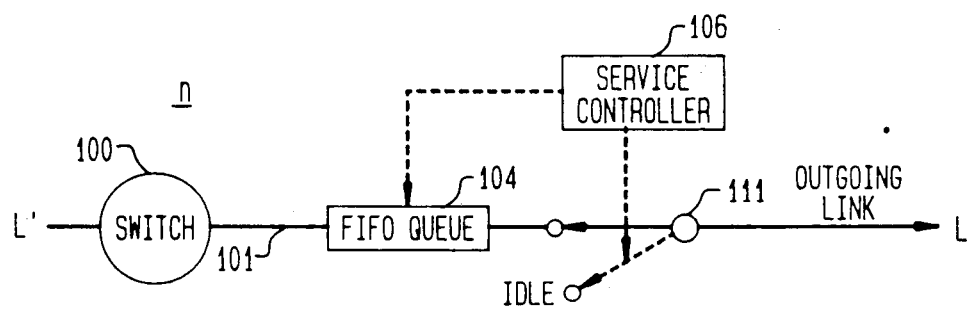

A node n which utilizes only one FIFO queue is illustrated in FIG. 8. Arriving packets which are routed by the switch 100 to the outgoing link L, emerge from the switch 100 on line 101 and are buffered in the FIFO queue 104. At the beginning of each outgoing frame the service controller 106 marks the number of packets in the queue 104 which arrived in the just preceding arriving frame. (Note, since the incoming and outgoing frames are synchronous, an outgoing frame begins immediately at the end of the incoming frame). Under the control of the service controller 106, the switch 111 connects the outgoing link L to the FIFO queue 104 at the beginning of the outgoing frame period and for just enough time so that only the packets which arrived in the queue 104 during the immediately preceding arriving frame achieve access to the outgoing link L. In this manner arriving packets leave via the outgoing link L in the adjacent outgoing frame. For the remainder of the outgoing frame period, the outgoing link L is idle.

It should be noted that the structure of the node of FIG. 8 differs from the structure of a node in a conventional packet network which utilizes a FIFO queuing strategy only in that the service controller 106 and switch 111 are included. It is thus a significant advantage of the transmission scheme of the present invention, that it can be implemented with only relatively minor modifications to the nodes of existing packet network.

Figure 9:
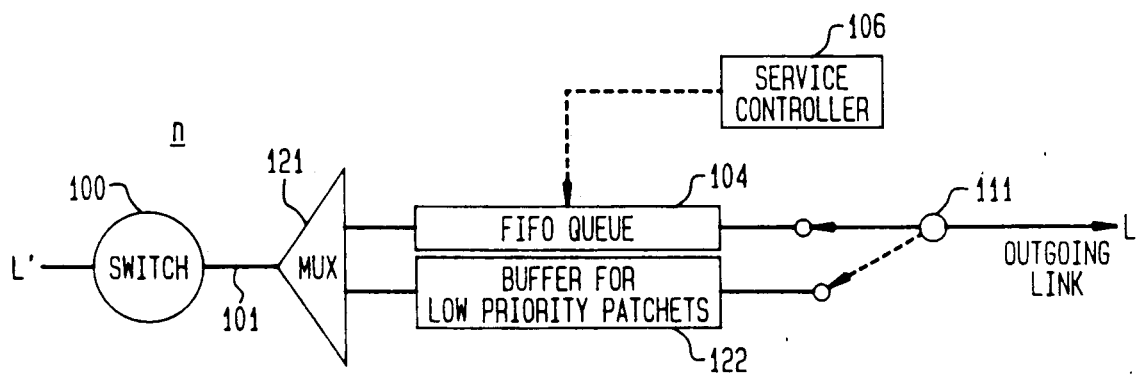

FIG. 9 shows a node structure which enables the idle period of the link L to transmit low priority packets. Illustratively, the packet network which includes the node n may transmit high priority packets in accordance with the congestion control scheme of the present invention and lower priority packets in accordance with an alternative congestion control scheme. As shown in FIG. 9, low and high priority packets emerge from the switch 100 on line 101. The multiplexer device 121 routes the high priority packets to the FIFO queue 104 and the low priority packets to the buffer 122. During the portion of each frame for which the switch 111 is not connected to the FIFO queue 104, it is connected to the buffer 122 so that the low priority packets can access the outgoing link L.

Figure 10:
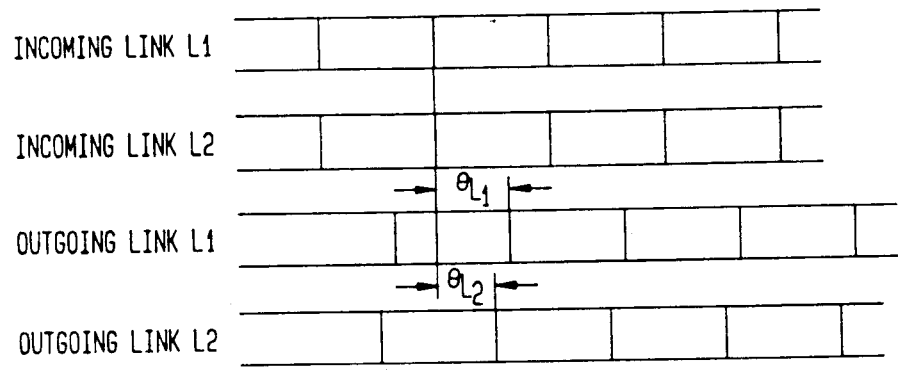
FIGS. 10 and 11 illustrate a node n'' and asynchronous outgoing frames departing the node n'', respectively.
Figure 11:
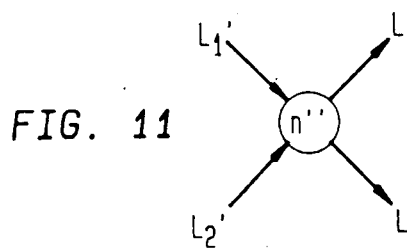

FIG. 10 shows a node n'' which has two incoming links $L_1'$, and $L_2'$ and two outgoing links $L_1$ and $L_2$. The incoming frames on the links $L_1'$, and $L_2'$ are shown in FIG. 11 along with the outgoing frames on the links $L_1$, $L_2$. The incoming frames on the incoming links are synchronous. However, the outgoing frames on the outgoing links $L_1$, $L_2$ are asynchronous. The time period between the end of an incoming frame and the beginning of the adjacent outgoing frame on link $L_1$ is $\theta_{L1}$. The time period between the end of an incoming frame and the beginning of the adjacent outgoing frame on link $L_2$ is $\theta_{L2}$.

Figure 12:
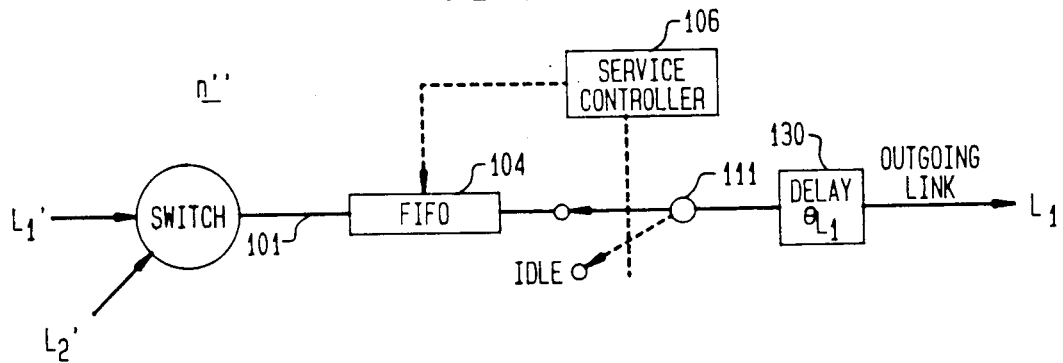
FIGS. 12 and 13 illustrate an implementation of the node n'' of FIG. 10 when the outgoing frames are asynchronous as shown in FIG. 11, in accordance with an illustrative embodiment of the present invention.

To account for the time periods $\theta_{L1}$ and $\theta_{L2}$ the node structure of FIG. 8 is modified to include appropriate delay elements. In particular, as shown in FIG. 12, packets arriving on the links $L_1'$ and $L_2'$ and destined for the outgoing $L_1$, leave the switch 100 via the line 101 and are stored in the FIFO 104. The service controller marks the packets which enter the FIFO 104 during each arriving frame period. The switch 111 connects the outgoing link $L_1$ to the FIFO 104 at the end of each arriving frame period for just enough time for the packets which arrived in the preceding arriving frame period to access the outgoing link $L_1$. For the remainder of the time, the link $L_1$ is disconnected from the FIFO 104. To insure that the packets which leave the FIFO 104 are transmitted via the outgoing link $L_1$ in the adjacent outgoing frame, the packets are processed by the delay element 130 of duration $\theta_{L1}$ before transmission via the outgoing link $L_1$. A similar delay of duration $\theta_{L2}$ is provided for the outgoing link $L_2$. The delay elements 130 have the effect of synchronizing the outgoing frames with the incoming frames.

Figure 13:
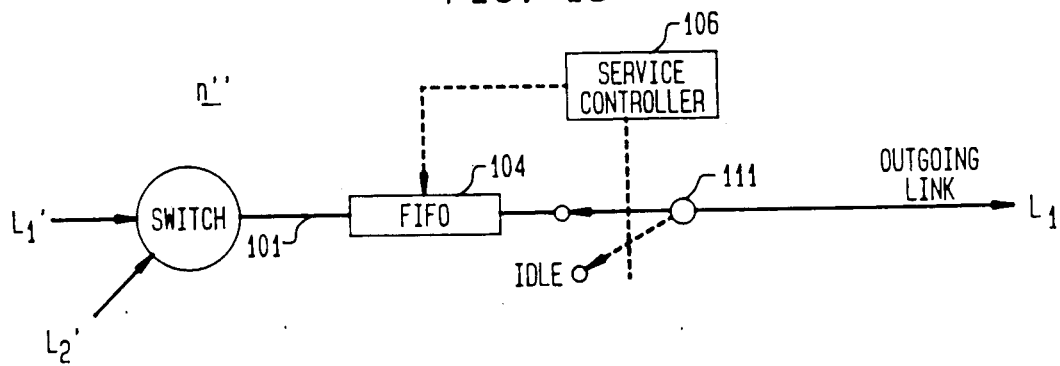

In a preferred embodiment of the invention, as shown in FIG. 13, the node n'' may be implemented by incorporating the delay 130 into the FIFO 104. This enables the node n'' of FIG. 13 to be implemented with only a minimal modification of the nodes in a conventional packet network. In this case, the service controller 106 marks the number of packets which arrived in a just ending incoming frame $\theta_{L1}$ seconds before the beginning of the next outgoing frame. At the start of the next outgoing frame, the link $L_1$ is connected to the FIFO 104 for only enough time for the marked number of packets to be serviced by the link $L_1$. This insures that each arriving packet is serviced in the adjacent outgoing frame. The node of FIG. 13 may be modified to include a buffer for low priority packets as shown in FIG. 9.

Figure 14:
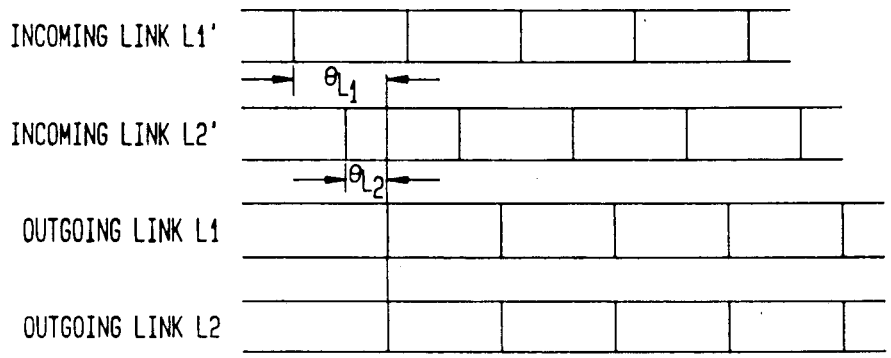
FIG. 14 illustrates asynchronous incoming frames arriving at a node n'' of FIG. 10.

FIG. 14 shows an alternative frame arrangement for the node n'' of FIG. 11. Recall that in the frame structure of FIG. 10, the frames arriving on the incoming links $L_1'$, $L_2'$ are synchronous and the frames on the outgoing links $L_1$, $L_2$ are asynchronous. In contrast, in FIG. 14, the frames on the incoming links $L_1'$, $L_2'$ are asynchronous and the frames on the outgoing links $L_1$, $L_2$ are synchronous. The time period $\theta_{L1}'$ is the time period between the end of an arriving frame on incoming link $L_1'$ and the beginning of the adjacent outgoing frame on the outgoing links $L_1$, $L_2$. Similarly, $\theta_{L2}'$ is the time period between the end of an arriving frame on incoming link $L_2'$ and the beginning of the adjacent outgoing frames on the links $L_1$, $L_2$.

Figure 15:
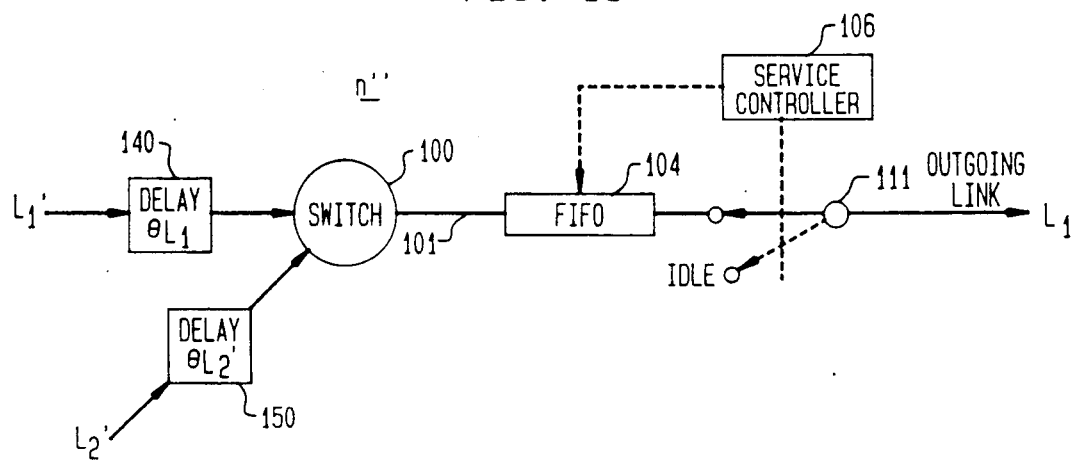
FIG. 15 illustrates a node structure for transmitting packets when the incoming frames are asynchronous as shown in FIG. 14, in accordance with an illustrative embodiment of the present invention.

A modification of the node of FIG. 8 to account for the time periods $\theta_{L1}'$ and $\theta_{L2}'$ is shown in FIG. 15. Packets arriving on the incoming links $L_1'$, $L_2'$ are delayed by the delay elements 140, 150 of durations $\theta_{L1}'$, $\theta_{L2}'$ respectively. The delay elements have the effect of synchronizing the incoming frames on links $L_1'$, $L_2'$ with the outgoing frames so that packets depart the node of FIG. 15 in the adjacent outgoing frame.

As shown in FIG. 15, after being processed by the delay elements 140, 150, packets destined for the outgoing link $L_1$, are routed by the switch 100 to the line 101 and FIFO 104. The service controller 106 and switch 111 control transmission of packets from the FIFO 104 to the outgoing link $L_1$ in the manner described above with reference to FIG. 8.

Another possible frame arrangement for the node n'' of FIG. 11 is for the arriving frames on the incoming links $L_1'$, $L_2'$ to be asynchronous and for the outgoing frames on the outgoing links to be asynchronous. To insure that packets arriving in particular incoming frames are transmitted in proper outgoing frames, appropriate delay elements (e.g. 140, 150 of FIG. 15) are utilized at the interfaces between the incoming links and the nodes and appropriate delay elements (e.g. 130 of FIG. 12) are utilized at the interfaces between the outgoing links and the nodes. Such delay elements have the effect of synchronizing the arriving and departing frames. In this case, for some pairs of incoming and outgoing links, the packets of an incoming frame will be transferred to the outgoing frame immediately after the adjacent outgoing frame. However, congestion free communication will still take place.

Figure 16:
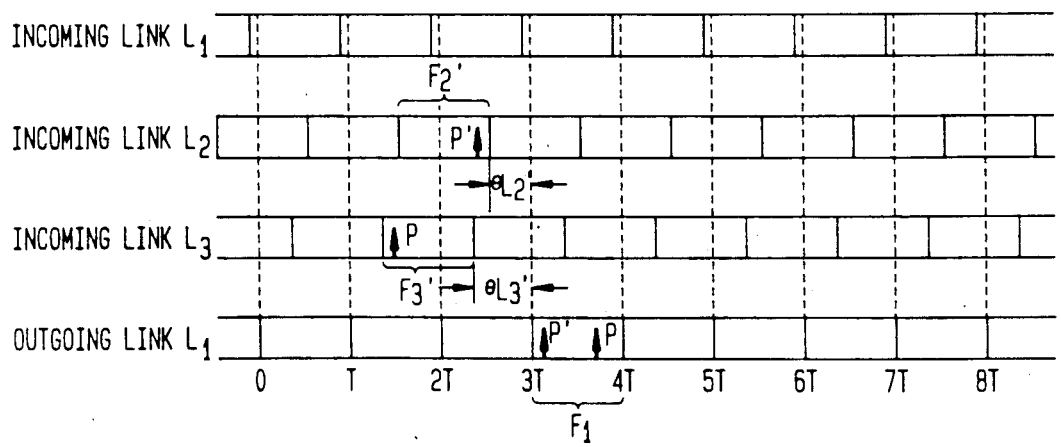
FIGS. 16 and 17 illustrate an alternative mechanism for transmitting packets when the frames arriving at or departing a node are asynchronous, in accordance with an illustrative embodiment of the present invention.

An alternative scheme for handling packets arriving at a node in asynchronous incoming frames is illustrated in connection with FIGS. 16 and 17. FIG. 16 shows the frame arrangement for a node with three incoming links $L_1'$, $L_2'$, $L_3'$ and one outgoing link $L_1$. The scheme FIGS. 16 and 17 is general and does not require synchronous outgoing frames.

Consider a packet P arriving on incoming link $L_3'$ in Frame $F_3'$. This packet leaves via the link $L_1$ in the adjacent outgoing frame which is $F_1$. The packet P may be delayed at the node by a maximum time period of just under 3T. If the packet P arrives at the beginning of the frame $F_3$, and it leaves the node at the end of the frame $F_1$ via the link $L_1$, then the delay is approximately equal to the duration of the frame $F_3'$, the duration of the mismatch $\theta_{L3}'$ between the frames on $L_3'$ and the frames on $L_1$ and the duration of the frame $F_1$. Since the duration of the mismatch $\theta_{L3}'$ is always less than T, the maximum delay for the packet P is just under 3T. Now consider the packet P' which arrives via the link $L_2'$ at the end of the frame $F_2'$. The earliest this packet can be transmitted is at the beginning of the adjacent outgoing frame $F_1$. Thus, the packet P' is delayed at the node for a minimum time of $\theta_{L2}'$ which is the mismatch between the frames on links $L_2'$ and $L_1$. Since $\theta_{L2}'$ can be quite small, the delay for the packet P' can approach zero. From the foregoing example, it can be seen that a packet is delayed at a node for a minimum time which can approach zero and for a maximum time which can approach 3T. Another way of looking at this is to say all packets are delayed for one of three possible time ranges: 0 and T, T and 2T, or 2T and 3T. Note also the packet P arrives at the node before the packet P' but leaves the node after the packet P'.

Figure 17:
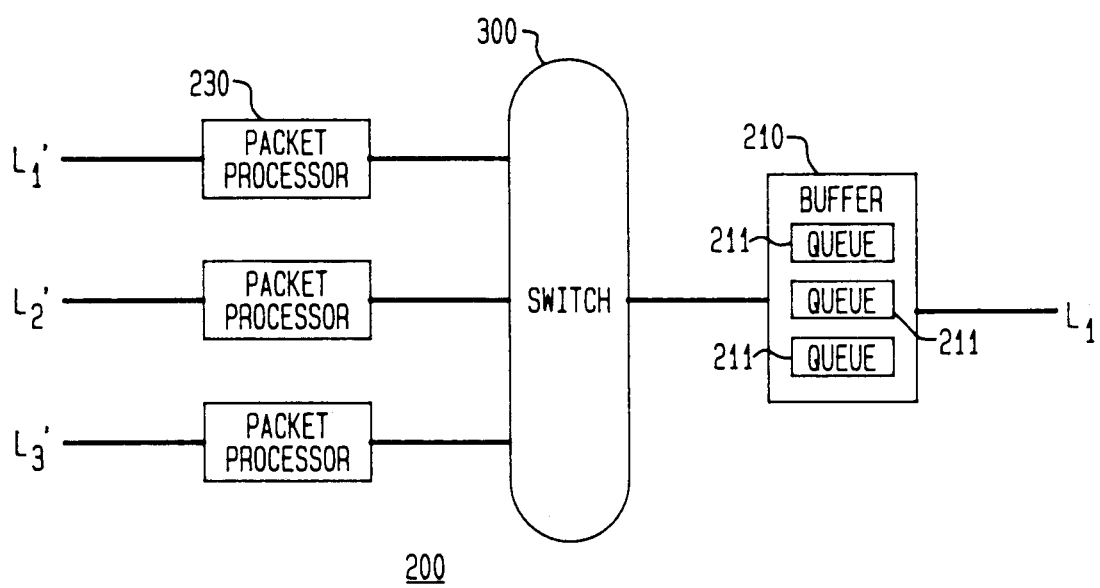

A node structure for handling the frame arrangement of FIG. 16 is illustrated in FIG. 17. The node 200 of FIG. 17 includes a buffer 210 associated with each outgoing link such as the outgoing link $L_1$. Illustratively, each buffer 210 is divided into three queues 211. The queues 211 of FIG. 17 are served by the link $L_1$ for successive outgoing frame intervals on a round robbin basis. Thus, for example, the queue 211 is serviced during the outgoing frame intervals [0, T], [3T, 4T] etc. (see FIG. 16) and another of the queues 211 is serviced during the outgoing frame intervals [T, 2T][4T, 5T] etc.

Each packet arriving at the node 200 of FIG. 17 via one of the incoming links $L_1'$, $L_2'$, $L_3'$ is processed by a packet processor 230 which marks the packet to indicate to which of the queues 211 the packet is to be routed. The packets are then routed by the switch 300 to the buffer unit 210 and stored in the appropriate queue 211 depending on how long a delay is required. In this manner it is assured that each packet is delayed in the node by the appropriate amount so it is transmitted from the node in the outgoing frame which is adjacent to its incoming frame.

CONCLUSION

A scheme for transmitting packets in a packet network involving traffic regulation at the source nodes and a queuing strategy at the network nodes has been disclosed. The scheme eliminates congestion and buffer overflow by maintaining the packet stream of each connection as smooth over all the links traversed by the connection so as to eliminate packet clustering. Finally, the above-described embodiments of the invention are intended to be illustrative only. Numerous alternative embodiments may be devised by those skilled in the art without departing from the spirit and scope of the following claims.

What is claimed is:

1. A method for transmitting packets in a packet switching network comprising a plurality of nodes interconnected by links, said packet network supporting a plurality of connections, each such connection k interconnecting a source node and a destination node, said method comprising the steps of
   for each link of said packet network, defining a sequence of successive, non-overlapping time intervals of duration T and transmitting packets between said nodes via said links in said intervals,
   for each connection k in said, packet network, limiting the number of packets admitted to the network at the source node in each successive interval of duration T to $R_k \cdot T$ where $r_k$ is a rate allocated to each said connection k such that the packet stream of connection k is smoothed at its source, and
   at each node is said packet network, delaying packets arriving at a node in a particular time interval at least until the particular interval has expired and then transmitting said delayed packets in a time interval following the particular interval.

2. The method of claim 1 wherein each connection k in said network has a source node and a packet stream for a connection k arriving at a source node in a frame of duration T is bound by $r_k \cdot T$.

3. A method for transmitting packets in a packet network comprising the steps of
   receiving packets at a node of said network on one or more incoming links in one or more sequences of incoming time intervals of duration T,
   delaying each of said packets such that each of said packets is transmitted from each said node on an outgoing link in a particular outgoing time interval from a sequence of outgoing time intervals of duration T, the particular outgoing time interval for each packet being adjacent to the incoming time interval during which the packet arrived at said node,
   the maximum number of packets of a connection k arriving at said node or leaving said node in one of said time intervals of duration T being bound by $r_k \cdot T$ where $r_k$ is a rate allocated to the connection k in units of packets per unit time such that the packet stream of connection k is smooth at its source node, and wherein said packets are received at said node on a plurality of incoming links and wherein the sequences of incoming time intervals associated with said incoming links are asynchronous.

4. A method for transmitting packets in a packet network comprising the steps of
   receiving packets at a node of said network on one or more incoming links in one or more sequences of incoming time intervals of duration T,
   transmitting each of said packets from said node on an outgoing link in a particular outgoing time interval from a sequence of outgoing time intervals of duration T, the particular outgoing time interval for each packet being adjacent to the incoming time interval during which the packet arrived at said node,
   the maximum number of packets of a connection k arriving at said node or leaving said node in one of said time intervals of duration T being bound by $r_k \cdot T$ where $r_k$ is a rate allocated to the connection k in units of packets per unit time such that the packet stream of connection k is smooth at its source node, and wherein said packets are transmitted from said node on a plurality of outgoing links and wherein the sequences of outgoing time intervals associated with said outgoing links are asynchronous.

5. A method for transmitting packets in a packet network comprising the steps of
   receiving packets at a node of said network on one or more incoming links in one or more sequences of incoming time intervals of duration T,
   transmitting each of said packets from said node on an outgoing link in a particular outgoing time interval from a sequence of outgoing time intervals of duration T, the particular outgoing time interval for each packet being adjacent to the incoming time interval during which the packet arrived at said node,
   the maximum number of packets of a connection k arriving at said node or leaving said node in one of said time intervals of duration T being bound by $r_k \cdot T$ where $r_k$ is a rate allocated to the connection k in units of packets per unit time such that the packet stream of connection k is smooth at its source node, and wherein the sum of all said $r_k$ allocated to all connections traversing a particular link in said network is less than or equal to the capacity of the link.

6. A method for transmitting packets in a packet network comprising the steps of receiving packets at a node of said network on one or more incoming links in one or more sequences of incoming time intervals of duration T, transmitting each of said packets from said node on an outgoing link in a particular outgoing time interval from a sequence of outgoing time intervals of duration T, the particular outgoing time interval for each packet being adjacent to the incoming time interval during which the packet arrived at said node, the maximum number of packets of a connection k arriving at said node or leaving said node in one of said time intervals of duration T being bound by $r_k \cdot T$ where $r_k$ is a rate allocated to the connection k in units of packets per unit time such that the packet stream of connection k is smooth at its source node, and wherein said rate $r_k$ allocated to a particular connection k is less than the maximum rate at connection k during any time interval of duration T and greater than the average rate of connection k over many time intervals of duration T.

7. A method for transmitting packets in a packet switching network comprising a plurality of nodes interconnected by links, said method comprising transmitting packets between nodes via said links in sequences of time intervals of duration T, the number of packets being transmitted by a connection k in one of said intervals being bound by $r_k \cdot T$ for each link traversed by the connection k and for the entire duration of the connection k, $r_k$ being a rate allocated to connection k in units of packets per unit time such that the packet stream of connection k is smooth at its source node, delaying each packet arriving at each node via a particular incoming link in a particular one of said time intervals and destined for a particular outgoing link at each said node, and transmitting each said delayed packet via said outgoing link in a time interval which is adjacent to the time interval in which the packet arrived at the node.

8. The method of claim 7 wherein the rate $r_k$ allocated to each connection k is less than the the maximum rate at connection k during any time interval of duration T and greater than the average rate of connection k over many time intervals of duration T.

9. The method of claim 8 wherein the sum of all said $r_k$ allocated to all the connections traversing a link less than or equal to the capacity of the link.

10. The method of claim 7 wherein the sequences of time intervals on different ones of said links have different origins in time.

11. A node for use in a packet network comprising means for receiving packets via one or more incoming links in one or more sequences of incoming time intervals of duration T, means for delaying each of said packets such that each of said packets is transmitted on an outgoing link in a particular outgoing time interval from a sequence of outgoing time intervals of duration T, said particular outgoing time interval being adjacent to the incoming time interval during which the packet arrived at said node, for a connection k in said network, the maximum number of packets arriving at said node or leaving said node in one of said time intervals of duration T being bound by $r_k \cdot T$ where $r_k$ is a rate allocated to the connection k in units of packets per unit time such that the packet stream of connection k is smooth at its source node.

12. A node for use in a packet network comprising means for receiving packets via one or more incoming links in one or more sequences of incoming time intervals of duration T, means for transmitting each of said packets on an outgoing link in a particular outgoing time interval from a sequence of outgoing time intervals of duration T, said particular outgoing time interval being adjacent to the incoming time interval during which the packet arrived at said node, for a connection k in said network, the maximum number of packets arriving at said node in one of said time intervals of duration T being bound by $r_k \cdot T$ where $r_k$ is a rate allocated to the connection k in units of packets per unit time such that the packet stream of connection k is smooth at its source node, and wherein said incoming time intervals and said outgoing time intervals are synchronous, and wherein said transmitting means includes first and second FIFO queues associated with said particular outgoing link, and switch means for enabling packets to be stored into said first FIFO queue and transmitted out of said second FIFO queue onto said particular outgoing link and for enabling packets to be stored in said second FIFO queue and transmitted out of said first FIFO queue onto said particular outgoing link in alternate ones of said time intervals.

13. A node for use in a packet network comprising means for receiving packets via one or more incoming links in one or more sequences of incoming time intervals of duration T, means for transmitting each of said packets on an outgoing link in a particular outgoing time interval from a sequence of outgoing time intervals of duration T, said particular outgoing time interval being adjacent to the incoming time interval during which the packet arrived at said node, for a connection k in said network, the maximum number of packets arriving at said node in one of said time intervals of duration T being bound by $r_k \cdot T$ where $r_k$ is a rate allocated to the connection k in units of packets per unit time such that the packet stream of connection k is smooth at its source node, and wherein said transmitting means includes a FIFO queue associated with said particular outgoing link and control means for insuring that packets stored in said FIFO queue in one of said incoming time intervals are transmitted to said particular outgoing link in the adjacent outgoing time interval.

14. The node of claim 13 wherein said control means comprises means associated with said FIFO queue for marking the number of packets arriving at said FIFO queue in one of said time intervals and switch means for connecting said FIFO queue to said particular outgoing link for a portion of the time interval which is adjacent to said one time interval so that said number of packets in said FIFO queue are transmitted to said particular outgoing link.

15. The node of claim 14 wherein said packets are high priority packets and wherein a buffer for additional low priority packets is associated with said particular outgoing link, said buffer being connected to the particular outgoing link when said FIFO queue is not connected thereto so that said low priority packets can be transmitted via said link.

16. The node of claim 13 wherein said node receives packets on a plurality of incoming links whose sequences of incoming time intervals are asynchronous, each of said plurality of incoming links interfacing said node by means of a delay element.

17. The node of claim 13 wherein packets leave said node in a plurality of outgoing links whose sequences of outgoing time intervals are asynchronous, each of said plurality of outgoing links interfacing said node by means of a delay element.

18. The node of claim 17 wherein said FIFO queue includes one of said delay elements.

19. The node of claim 13 wherein said node receives packets on a plurality of incoming links whose sequences of time intervals are asynchronous, wherein said node further includes means for marking arriving packets to indicate how long said arriving packets are to be delayed at said node, and wherein said transmitting means includes means for buffering said arriving packets for different durations as indicated by said marking means.

20. A method for transmitting packets in a packet switching network comprising a plurality of nodes interconnected by links, said packet network supporting a plurality of connections, each such connection k, interconnecting a source node and a destination node, said method comprising the steps of for each link fo said packet network, defining a sequence of successive, non-overlapping time frames of duration T and transmitting packets between said nodes via said links in said time frames, imposing a smoothness requirement on the number of packets entering a connection by limiting the number of packets admitted to the network for a connection at its source node during each time frame to a pre-determined maximum number, and maintaining the smoothness of the connection over each link traversed by each connection by delaying packets belonging to said connection and arriving at each node via an incoming link in a particular incoming frame and transmitting the packets via an outgoing link in a particular outgoing frame adjacent to said particular incoming frame.

21. A method for transmitting packets in a packet switching network comprising a plurality of nodes interconnected by links, said packet network supporting a plurality of connections, each such connection k, interconnecting a source node and a destination node, said method comprising the steps of for each link of said packet network, defining a sequence of successive, non-overlapping time itnervals of duration T and transmitting packets between said nodes via said links in said intervals, for each connection k in said packet network, imposing a smoothness requirement on the number of packets entering a connection by limiting the number of packets admitted to the network for a connection at its source node in each successive interval of duration T to $r_k \cdot T$ where $r_k$ is a rate allocated to each said connection k such that the sum of all $r_k$ allocated to each connection k traversing a particular link in the network does not exceed the capacity of the link, and maintaining the smoothness of the connection over each link traversed by each connection by delaying packets belonging to said connection and arriving at each node via an incoming link in a particular incoming frame and transmitting the packets via an outgoing link in a particular outgoing frame adjacent to said particular incoming frame.

* * * * *

UNITED STATES PATENT AND TRADEMARK OFFICE
CERTIFICATE OF CORRECTION

PATENT NO. : 5,050,162
DATED : September 17, 1991
INVENTOR(S) : S. Jamaloddin Golestani It is certified that error appears in the above-identified patent and that said Letters Patent is hereby corrected as shown below:

Column 17, line 14, "asynchronous" should read --synchronous--.

Column 13, line 66, "is" should read --in--.

Column 17, line 41, "fo" should read --of--.

Signed and Sealed this

Fifteenth Day of February, 1994

Attest:

BRUCE LEHMAN

Attesting Officer

Commissioner of Patents and Trademarks